UNITED STATES PATENT OFFICE.

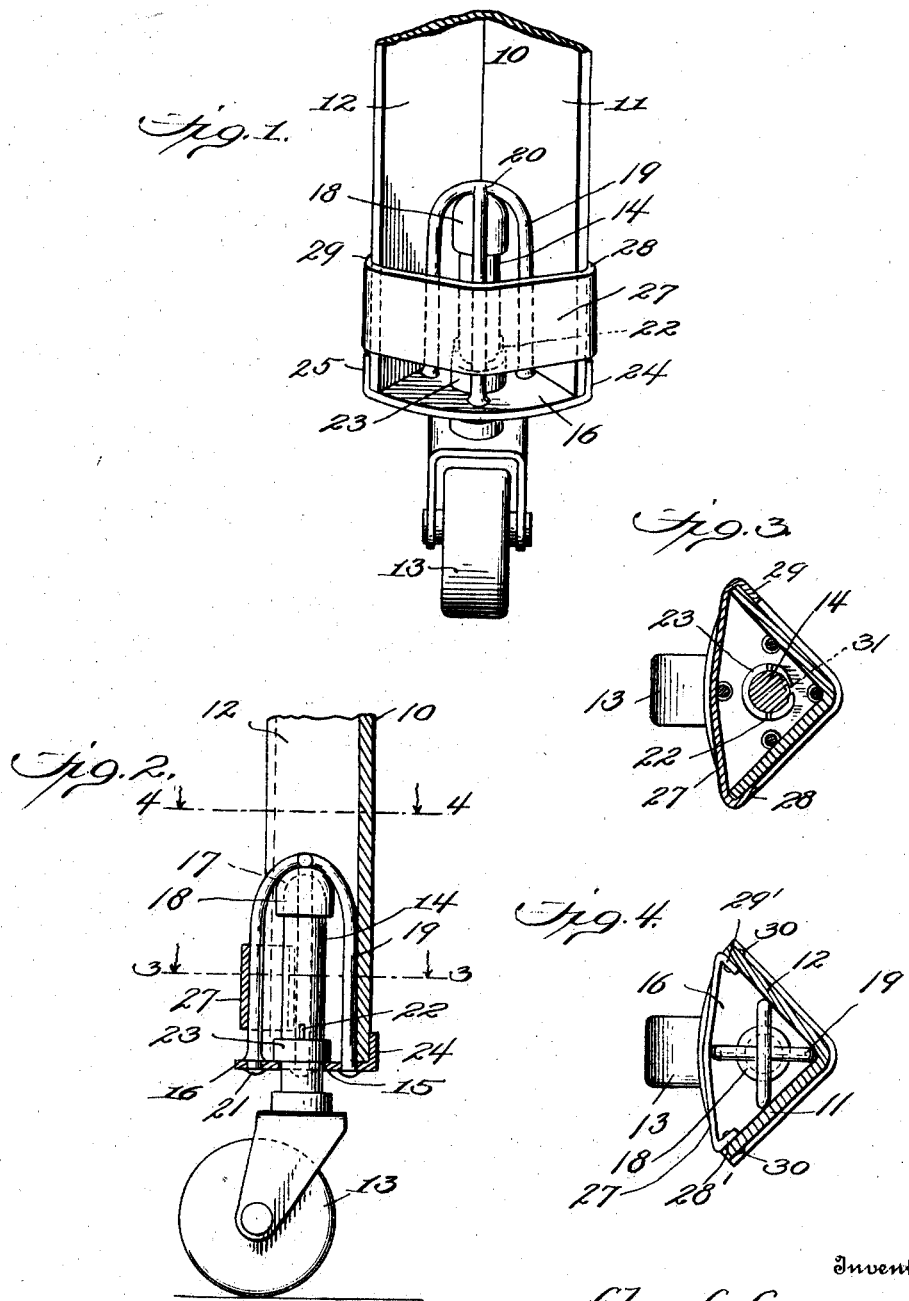

GLENN G. GREENE, OF WARREN, PENNSYLVANIA, ASSIGNOR TO G. G. G. METAL STAMPING COMPANY, OF WARREN, PENNSYLVANIA, A CORPORATION OF PENNSYLVANIA.

CASTER FOR ANGLE-BAR FURNITURE.

1,396,681.      Specification of Letters Patent.      Patented Nov. 8, 1921.

Application filed February 10, 1921. Serial No. 443,925.

*To all whom it may concern:*

Be it known that I, GLENN G. GREENE, a citizen of the United States, residing at Warren, in the county of Warren and State of Pennsylvania, have invented new and useful Improvements in Casters for Angle-Bar Furniture, of which the following is a specification.

This invention relates to a caster holder intended to be applied primarily to furniture having legs or a frame consisting of vertical angle bars and to the means for retaining the caster holder in operative position.

An object of the invention is to provide a caster mount which will frictionally retain the caster holder in position and from which the latter may be readily detached when desired for convience in shipping, storage or the like.

My invention involves no change in the structure of the angle bars of the furniture but provides a construction which can be universally applied to furniture having angle bar members. My invention reduces the number of structural parts necessary in devices of this character to a minimum, since the retaining means consists of a single element, and provides a device which can be readily and economically manufactured and applied.

The invention is described in connection with the accompanying drawings illustrative of the preferred form of my invention.

In the drawings:—

Figure 1 is a perspective view of the caster and caster mount applied to an angle bar member.

Fig. 2 is a vertical section through one of the flanges of the angle bar member illustrated in Fig. 1.

Fig. 3 is a section on the line 3—3 of Fig. 2, looking in the direction of the arrows.

Fig. 4 is a section on the line 4—4 of Fig. 2 showing a slightly modified form.

In the illustrated embodiment of my invention the numeral 10 represents the angle bar member of the leg or supporting frame of the furniture and this angle bar, as shown, is provided with the flanges 11 and 12 disposed at right angles and of equal width. The caster is provided with the roller 13, and the usual frame having a pintle 14 which is adapted to be inserted through an aperture 15 formed in a base-plate 16. The upper end of the pintle 14 is rounded, as indicated at 17, and is received within a tubular cap 18 secured to the upper part of a cage. The cage consists of intersecting U-shaped wires 19 disposed in inverted position with the adjacent arms substantially 90° apart as also shown in my Patent #1,150,359 dated Aug. 17, 1915. The cap 18 is preferably secured to the wires at their point of intersection 20 by soldering, welding or the like. The lower ends of the wires 19 pass through suitable apertures in base-plate 16 and these terminals of the wire are made fast to the base-plate by having their ends 21 riveted over and by soldering or other suitable means. The pintle 14 of the caster has projections or ribs 22 struck up therefrom so as to project outwardly and extend over the edge of a split collar 23 which is inserted between the base plate 16 and the ribs 22. The pintle is also formed with a flat portion 31 forming in section a chord limiting the circular section of the pintle. One end of the collar 23 is bent to engage this flat portion and thus retain the collar from rotation. The flat portion terminates in a shoulder in the same horizontal plane as the lower edges of the ribs 22 so that the ribs and shoulder coöperate with the collar in preventing the withdrawal of the caster pintle 14 through the base plate 16. Thus the caster pintle is retained within the base plate with its upper end bearing rotatably in the cap 18.

The base plate 16 is of somewhat triangular shape and is provided along two sides with flanges 24, 25 adapted to engage the sides of the flanges 11 and 12 respectively of the angle bar member so as to prevent lateral movement of the angle bar member with reference to the base-plate.

The wire cage is preferably of such dimension that the distance between opposite members at their widest separation slightly exceeds the distance from the apex of the angle 10 to the surface of a plate hereinafter described, which connects the outer edges of the flanges 11 and 12. This plate is designated by the reference numeral 27 and as herein shown is intermediately bent to a convex contour and has its ends 28 and 29 bent over so as to tightly engage the edges of the flanges 11 and 12. In this form of my invention the plate 27 has its bent-over ends 28 and 29 tightly pressed in position, but it will be understood that this plate may be otherwise attached for instance, as shown in Fig. 4 where the bent-over ends 28' and 29' are disposed on the inside of the flanges 11 and 12 and connected thereto by means of the rivets 30.

In operation the cage consisting of the wire members 19 having the caster assembled therein is inserted within the angular frame member 10 so that one of the wires is disposed in the angle formed by the intersection of the flanges 11 and 12. The plate 27 then frictionally engages the opposite wire 19 and as the caster holder is moved to final position the flanges 24, 25 engage the exterior of the flanges of the angle bar. The inherent elastic qualities of the material of the plate 27 and wires 19 permit them to yield sufficiently for the insertion of the caster with its cage but frictionally hold the same in position with sufficient force to require a direct pull of some magnitude to release the assembled cage and caster.

I have herein described the preferred form of my invention wherein the relative dimensions of the angle bar member and the cage have been specified, as well as the formation of the plate 27, but it will be understood that modifications may be made in the structure herein shown, such as providing the cage and angle bar member with different relative dimensions and using a straight or concave plate 27, without departing from the spirit and scope of my invention as expressed in the appended claims.

Having described my invention what I claim as new and desire to secure by Letters Patent, is:—

1. The combination with an angle frame member, of a caster holder having an apertured base plate provided with upturned flanges for engaging exteriorly the flanges of said angle member, and a cage secured to the base plate having a tubular cap attached thereto, a caster having a pintle passing through the aperture of said base plate, the upper end of said pintle being rotatably mounted in said cap, and a plate extending across the open side of said angle member and fastened to the flanges thereof for frictionally engaging said cage and thereby, in conjunction with said base plate and the flanges thereof, retaining said holder in operative position.

2. The combination with an angle frame, of a caster holder in which a caster is mounted, said caster holder comprising a base plate and a cage attached to said base plate, and a plate extending across the open side of said angle member secured to the flanges thereof and adapted to frictionally engage said cage for retaining said holder in operative position.

3. The combination with an angle frame, of a caster holder in which a caster is mounted, said caster holder comprising a base plate and a cage attached to said base plate, and a single plate extending across the open side of said angle member for frictionally engaging said cage, said plate having bent over ends adapted to be firmly pressed into engagement with the flanges of the angle frame.

4. The combination with an angle frame member, of a caster holder having a caster mounted therein, said caster holder comprising a base plate and a cage including inverted U-shaped wires intersecting substantially at right angles and attached to said base plate, and a plate extending across the open side of said angle member and secured to the flanges thereof, one of said U-shaped wires being positioned with one arm in the angle of the angle frame member and the opposite arm frictionally engaging said plate.

5. In combination, a caster having a cylindrical pintle provided with a flat portion, projecting ribs and a rounded upper end, a holder comprising a base plate formed with an aperture for receiving said pintle, a cage secured to said base plate having a bearing for the upper rounded end of said pintle, and a split collar embracing said pintle and inserted between said ribs and base plate provided with a bent part adapted to engage said flat portion.

6. In combination, a caster having a pintle provided with projecting ribs, a holder comprising a base plate formed with an aperture for receiving said pintle, a cage secured to said base plate having a bearing for the upper end of said pintle, and a collar embracing the pintle inserted between said ribs and base plate for retaining the pintle within the base plate and the upper end thereof in said bearing.

In testimony whereof I have hereunto set my hand in presence of two subscribing witnesses.

GLENN G. GREENE.

Witnesses:
A. M. HULING,
A. M. MEAD.